United States Patent [19]

Ueda

[11] Patent Number: 5,015,077

[45] Date of Patent: May 14, 1991

[54] ZOOM LENS SYSTEM FOR USE IN A MICROFILM PROJECTION APPARATUS

[75] Inventor: Toshihiko Ueda, Osaka, Japan

[73] Assignee: Minolta Camera Kabushiki Kaisha, Osaka, Japan

[21] Appl. No.: 485,553

[22] Filed: Feb. 27, 1990

[30] Foreign Application Priority Data

Feb. 28, 1989 [JP] Japan ................................. 1-47491

[51] Int. Cl.$^5$ ..................... G02B 15/177; G02B 15/20
[52] U.S. Cl. ..................................... 350/426; 350/423
[58] Field of Search ...................... 350/423, 427, 426

[56] References Cited

U.S. PATENT DOCUMENTS

| | | | |
|---|---|---|---|
| 4,198,128 | 4/1980 | Ogino | 350/423 |
| 4,303,311 | 12/1981 | Nakamura | 350/427 |
| 4,696,553 | 9/1987 | Tsuji et al. | 350/427 |
| 4,733,951 | 3/1988 | Pareigat | 350/423 |
| 4,743,102 | 5/1988 | Pareigat | 350/423 |
| 4,746,204 | 5/1988 | Pareigat | 350/423 |
| 4,750,820 | 6/1988 | Pareigat | 350/423 |
| 4,824,236 | 4/1989 | Ueda | 350/427 |
| 4,838,667 | 6/1989 | Ueda | 350/427 |
| 4,887,891 | 12/1989 | Ueda | 350/427 |
| 4,906,078 | 3/1990 | Inabata et al. | 350/426 X |

FOREIGN PATENT DOCUMENTS 1244934  9/1960  France .................................. 350/427
57-737515  5/1982  Japan .
62-237414  10/1987  Japan .

*Primary Examiner*—Paul M. Dzierzynski
*Assistant Examiner*—David R. Parsons
*Attorney, Agent, or Firm*—Price, Gess & Ubell

[57] ABSTRACT

A zoom lens system comprising, in order from an enlargement side, a first lens group of a negative power, a second lens group of a positive power and a third lens group of a positive power. The first lens group is fixed during a zooming operation from a longest focal length condition to a shortest local length condition and includes, in order from the enlargement side, a positive lens element, a negative lens element and an aperture stop. The second lens group includes two positive lens units which are movable independently of each other toward a reduction side during the zooming operation. The third lens group is also movable toward the reduction side during the zooming operation and includes, in order from the enlargement side, a positive lens element and a negative lens element.

6 Claims, 8 Drawing Sheets

LONGEST FOCAL CONDITION

SHORTEST FOCAL CONDITION

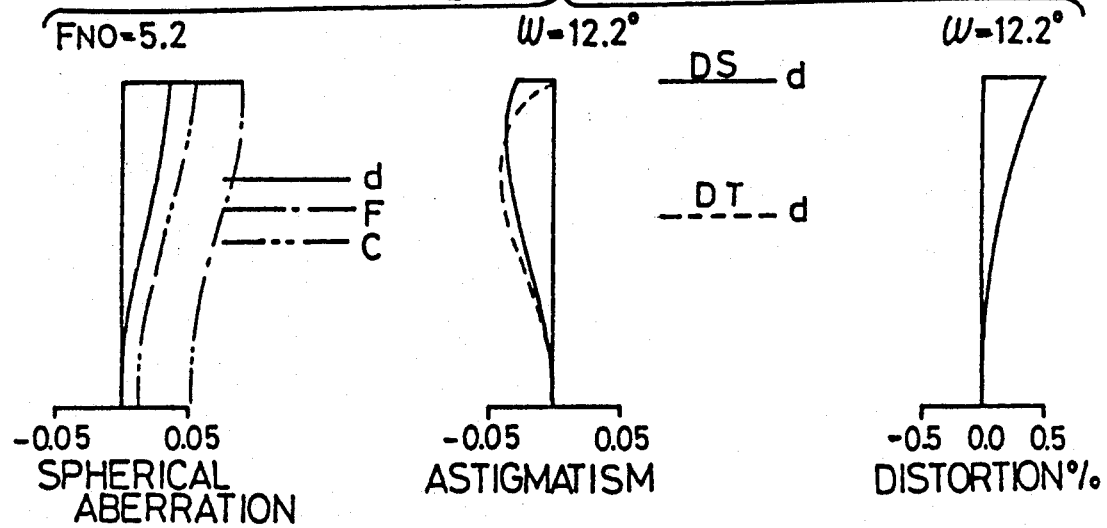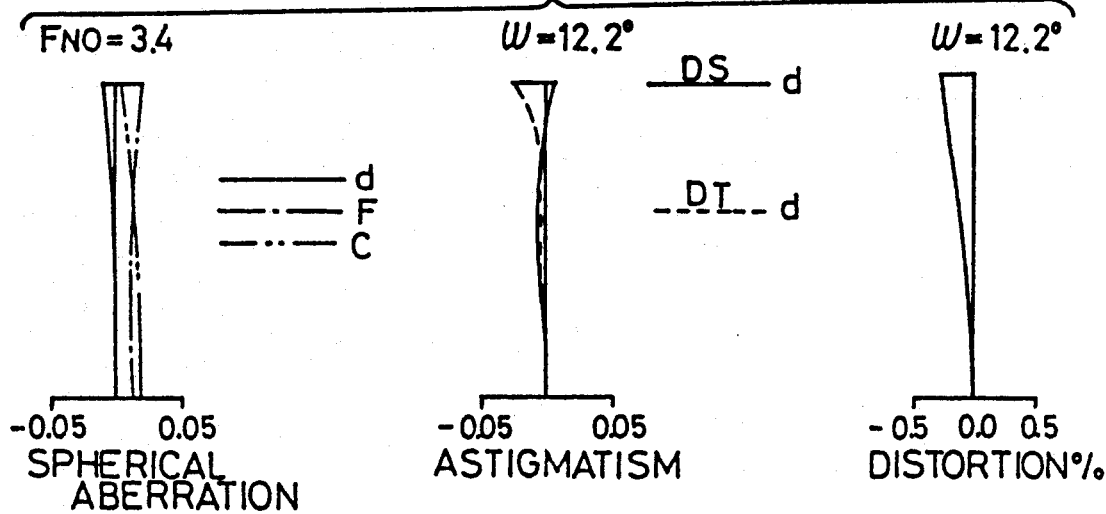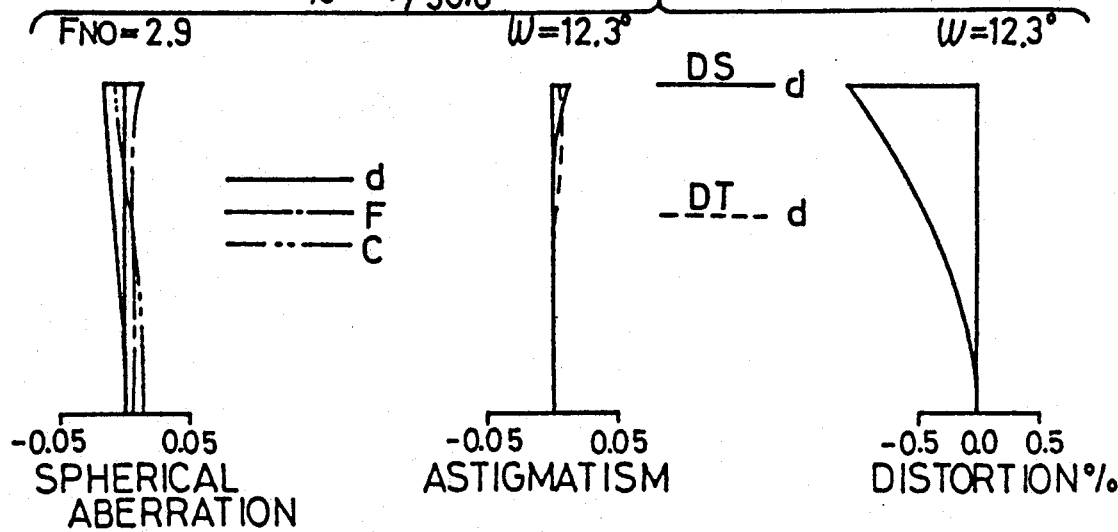

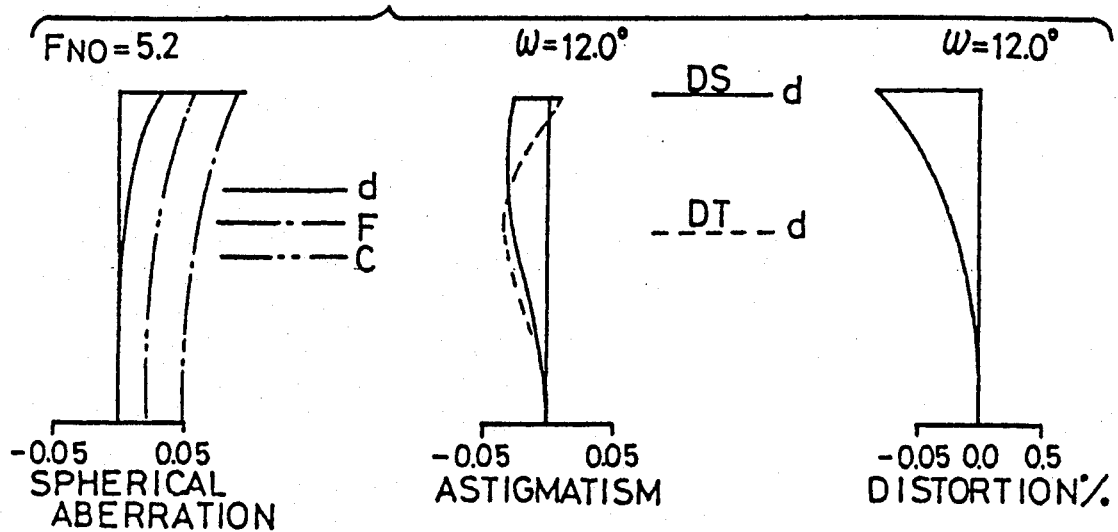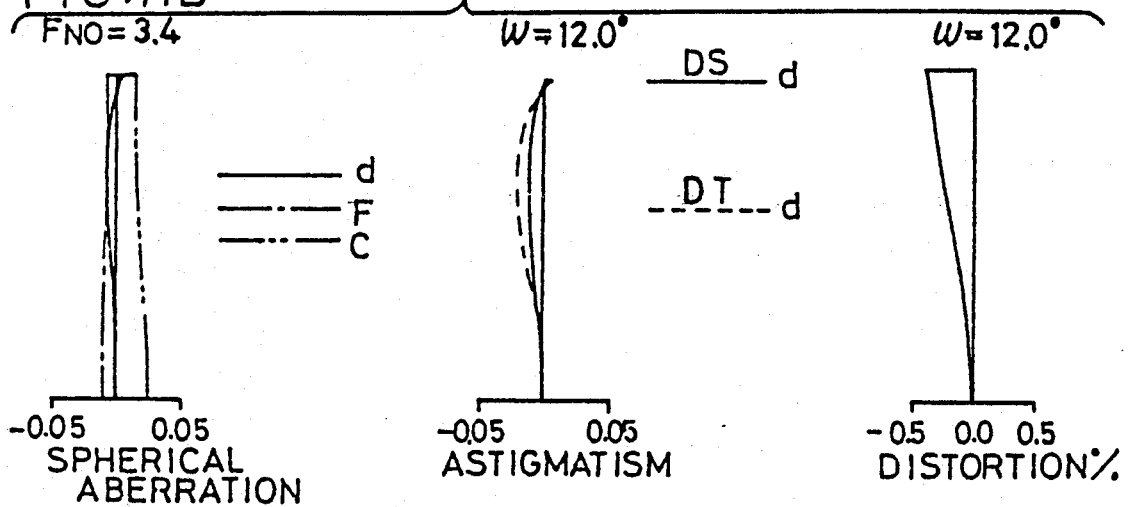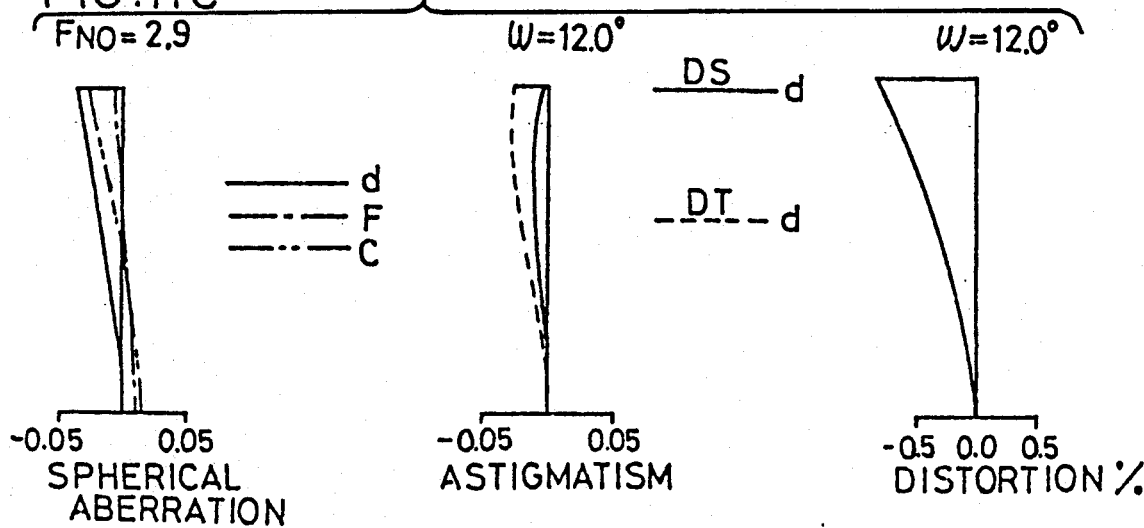

ZOOM LENS SYSTEM FOR USE IN A MICROFILM PROJECTION APPARATUS

BACKGROUND OF THE INVENTION

1. Field of the Invention

The present invention relates to a zoom lens system, and more particularly to a zoom lens system for use in an image projecting apparatus such as a microfilm reader or a microfilm reader/printer which projects microfilm images and has a limited conjugate length.

2. Description of the Prior Art

A microfilm includes a plurality of images thereon which are not always recorded in the same direction. Therefore, an image projecting apparatus such as a microfilm reader or a microfilm reader/printer has a prism disposed between a projecting lens and an image receiving plane for optically rotating images. This prism normally is disposed adjacent an enlargement side of the projecting lens for compactness.

In such an image projecting apparatus, as shown in FIG. 2, an image of a microfilm held by a microfilm holder 1 comprising two flat glass plates is projected onto a screen 7 through a projecting lens system 2, an image rotating prism 3 and mirrors 4–6. A dove prism may be used as the image rotating prism 3 for compactness of the prism itself. In order for the entire projected image to enter this prism 3, it is desirable to arrange the projecting lens system 2 and prism 3 as close to each other as possible, and to arrange the pupil position of the projecting lens 2 as close to the prism 3 as possible.

Zoom lens systems used as such a projecting lens system of the image projecting apparatus are disclosed in Japanese Patent Publication Kokai No. 62-237414, U.S. Pat. No. 4,733,951, U.S. Pat. No. 4,745,204, U.S. Pat. No. 4,743,102 and U.S. Pat. No. 4,750,820.

The zoom lens system disclosed in Japanese Patent Publication Kokai No. 62-237414, as shown in FIG. 3B, is a positive-negative, two group zoom lens system comprising a positive lens group 8 at an enlargement side and a negative lens group 9 at a reduction side. An aperture stop S is fixedly disposed at the enlargement side of the lens system. Reference F denotes a microfilm plane. With such a positive-negative, two group zoom lens system, however, when the zoom ratio is increased to twofold, the positive lens group moves a great distance with a zooming operation and, since the aperture stop S is fixed, a main beam of a maximum angle of view has a very large incident angle $\alpha O$ with respect to the positive lens group 8 at a shortest focal length side. This entails an increase in the outer diameter of the lenses and difficulties in compensating for aberration. U.S. Pat. No. 4,733,951 also discloses a positive-negative, two zoom lens system which has a similar drawback.

On the other hand, the zoom lens systems disclosed in U.S. Pat. No. 4,746,204, U.S. Pat. No. 4,743,102 and U.S. Pat. No. 4,750,820 are negative-positive, two group lens systems comprising a negative lens group at an enlargement side and a positive lens group at a reduction side. Such a negative-positive lens system has a wide angle of view but, because of its construction, has a principal point located relatively close to the reduction side, and hence the disadvantage of having an increased overall length of the lens system.

SUMMARY OF THE INVENTION

Having regard to the above, an object of the present invention is to provide a zoom lens system of excellent performance having a relatively high zoom ratio exceeding twofold.

The above object is fulfilled, according to the present invention, by a zoom lens system comprising, in order from an enlargement side, a first lens group of a negative power which is fixed during a zooming operation and includes, in order from the enlargement side, a positive lens element and a negative lens element; a second lens group of a positive power which is movable during a zooming operation and includes, in order from the enlargement side, a first positive lens unit and a second positive lens unit, the first positive lens unit having a positive lens element and a negative meniscus lens element, the second positive lens unit having two positive lens elements and two negative lens elements, the first and second positive lens units being independently movable toward a reduction side during a zooming operation from a longest focal length condition to a shortest focal length condition; and a third lens group of a positive power which is movable during a zooming operation and includes, in order from the enlargement side, a positive lens element and a negative lens element.

BRIEF DESCRIPTION OF THE DRAWINGS

These and other objects or features of the present invention will become apparent from the following description of a preferred embodiment thereof taken in conjunction with the accompanying drawings, in which:

FIGS. 9A, 9B and 9C through 11A, 11B and 11C are views showing aberration curves in Examples 1 through 3, respectively.

DESCRIPTION OF THE PREFERRED EMBODIMENT

Figure 1:
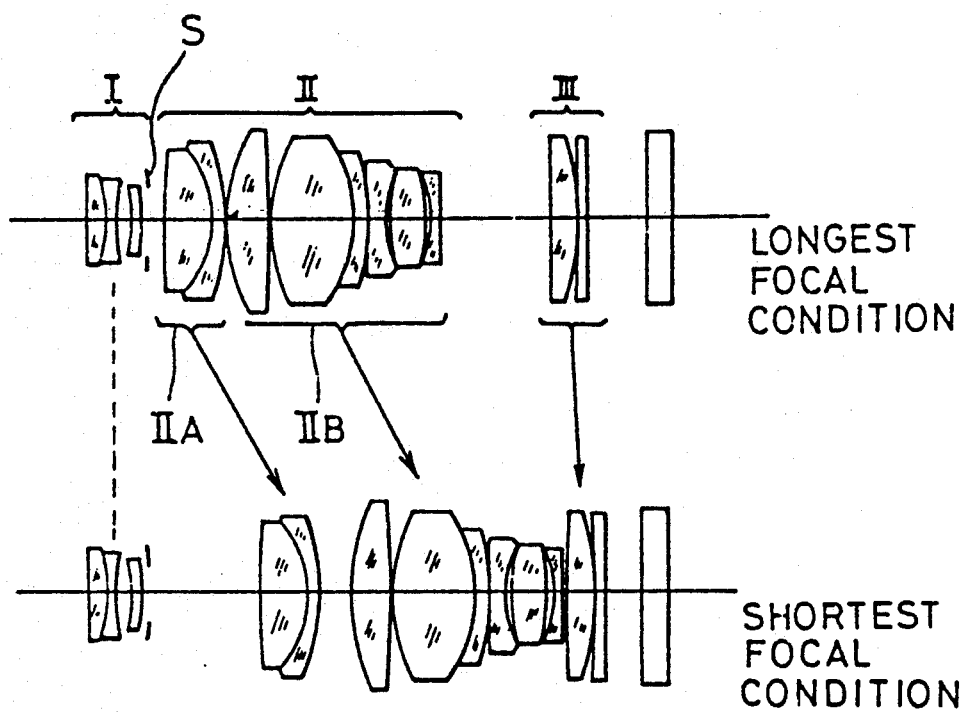
FIG. 1 is a sectional view of a zoom lens system having a limited conjugate length according to the present invention.
Figure 2:
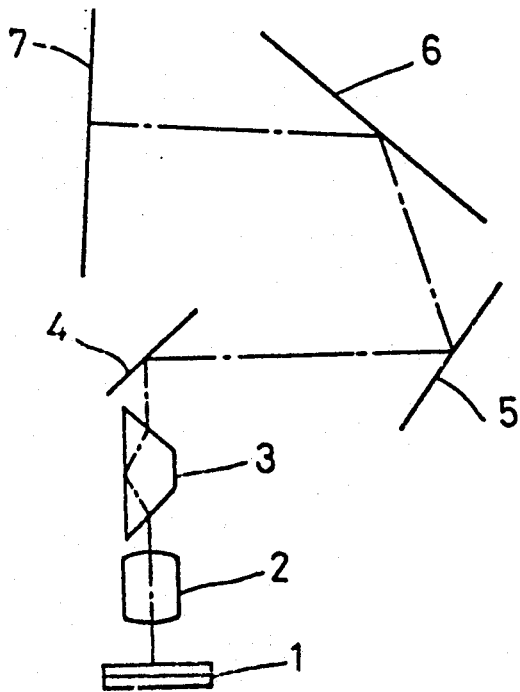
FIG. 2 is a schematic view of an optical path of a microfilm projecting apparatus to which the zoom lens system of the present invention is applied.

FIG. 1 shows a zoom lens system embodying the present invention. This zoom lens system is used as the projecting lens of the image projecting apparatus shown in FIG. 2. The zoom lens system comprises, from an enlargement side, a first lens group I of a negative power which is fixed during a zooming operation, a second lens group II of a positive power which is movable during a zooming operation, and a third lens group III of a positive power which is movable during a zooming operation. An aperture stop S is included in the first lens group I and is fixed during a zooming operation. The second lens group II includes a first positive lens unit $II_A$ disposed at the enlargement side, and a second positive lens unit $II_B$ disposed at the reduction side. The two units $II_A$ and $II_B$ move independently of each other toward the reduction side during a zooming operation from a longest focal length condition to a shortest focal length condition. The third lens group III moves from the enlargement side to the reduction side and then back to the enlargement side during the zooming operation from the longest focal length condition to the shortest focal length condition.

In this zoom lens system, the aperture stop S is disposed adjacent the enlargement side of the lens system to be close to the image rotating prism for compactness of the prism. The image rotating prism such as a dove prism is equivalent to a plain parallel plate inclined at an angle to the optical axis, and therefore its performance is varied with its position even within the same image circle. An enlargement of the prism increases axial astigmatism produced in proportion to the bottom length of the prism. Therefore, a reduction in size of the prism helps toward a high quality image. The aperture stop S is fixed during a zooming operation in order to reduce variations in divergence of off-axial rays occurring at the enlargement side during the zooming operation.

Figure 3A:
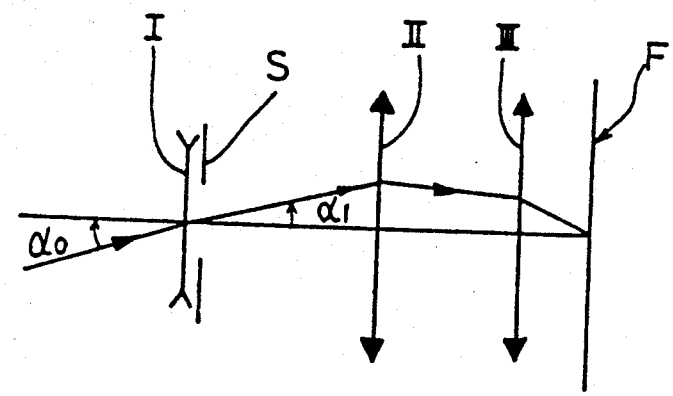
FIG. 3A is a schematic view showing a paraxial power arrangement according to the present invention.
Figure 3B:
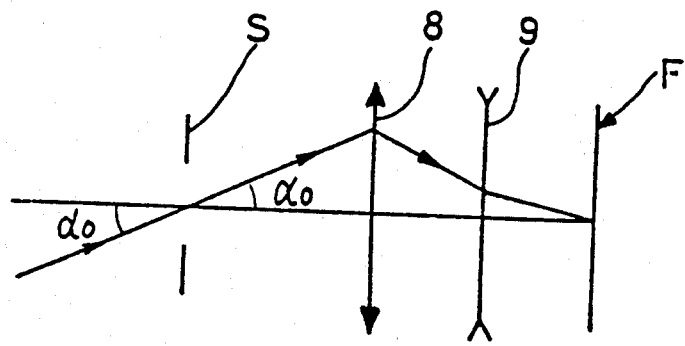
FIG. 3B is a schematic view showing a paraxial power arrangement of a conventional two group zoom lens system.

As shown in FIG. 3A, with the zoom lens system in this embodiment, a principal ray of a maximum angle of view toward the second lens group II has a reduced incident angle $\alpha_1$ owing to the negative power of the first lens group I in the shortest focal length condition. This construction eliminates the drawback of the positive-negative, two group zoom lens system shown in FIG. 3B.

Since the first lens group I has a negative power, the movement of the second lens group II effectively contributes toward variation of magnification.

Figure 4:
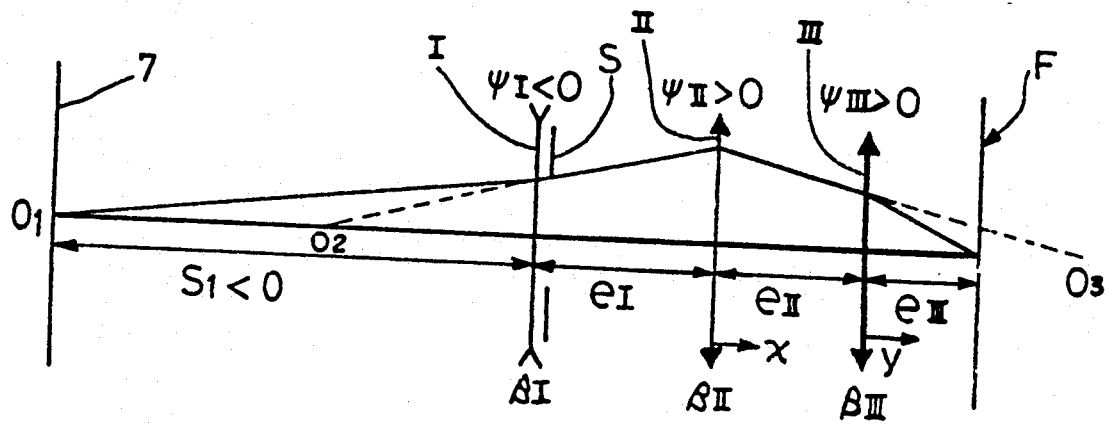
FIG. 4 is a schematic view showing a relationship between movable lens groups in the present invention.

This feature will be described with reference to FIG. 4 showing a paraxial power arrangement. It is assumed that, in FIG. 4, the powers (inverse numbers of the focal lengths) of the first to third lens groups I-III to be $\psi_I$, $\psi_{II}$ and $\psi_{III}$, respectively. Therefore, $\psi_L = 1/f_I < 0$, $\psi_{LL} = 1/f_{II} > 0$, and $\psi_{III} = f_{III} > 0$.

Assuming further that an object is at a distance $S_1$ (which is smaller than zero) from the first lens group I, the first and second lens groups I and II have a calculated distance e1 therebetween (a distance calculated by regarding principal planes of the lens groups as the bases) in the longest focal length condition, the second and third lens groups II and III have a calculated distance e11 therebetween in the longest focal length condition, the third lens group III and a microfilm plane have a calculated distance $e_{III}$ therebetween in the longest focal length condition, the first to third lens groups I-III have lateral magnifications (with the object point at the enlargement side) $\beta_I$, $\beta_{II}$ and $\beta_{III}$, respectively, the second lens group II has an amount of movement $\chi$ from the longest focal length condition, and the third lens group III has an amount of movement y from the longest focal length condition, $$\beta_I = \frac{1}{\psi_I S_1 + 1} > 0 \text{(constant)} \quad [a]$$

$$\beta_{II} = \frac{-1}{\psi_{II}\chi + \psi_{II}\left(e_I - \frac{S_1}{\psi_I S_1 + 1}\right) - 1} < 0 \quad [b]$$

$$\beta_{III} = \psi_{III}(y - e_{III}) + 1 \quad [c]$$

Since the first lens group I is fixed, $\beta_I$ has a fixed value greater than zero. $\beta_{II}$ contributes to magnification since object point $O_2$ is fixed for the second lens group II and is much closer to the second lens group II than to the screen 7 and, as is clear from the equation [b] above, approaches zero in a monotonic increase while taking the value $\beta_{II} > 0$ when $\chi > 0$. $\beta_{III}$, as object point $O_3$, increases and decreases with changes of y, and hardly contributes toward variation of magnification.

Thus, with the magnification of the entire system $\beta = \beta_I \cdot \beta_{II} \cdot \beta_{III}$, $\beta_{II}$ has its absolute value approaching zero to effectively contribute to variation of magnification in response to a zooming operation from the longest focal length condition to the shortest focal length condition.

Table 1 shows values of $\beta_I$, $\beta_{II}$ and $\beta_{III}$ in the longest focal length condition ($\beta = -1/23$), an intermediate focal length condition ($\beta = -1/38$) and the shortest focal length condition ($\beta = -1/50$) in Example 1 which is a typical example.

TABLE 1

|  | $\beta^I$ | $\beta^{II}$ | $\beta^{III}$ |
|---|---|---|---|
| LONGEST FOCAL CONDITION | 0.0325 | −0.1803 | 0.743 |
| INTER. FOCAL CONDITION | 0.0325 | −0.971 | 0.834 |
| SHORTEST FOCAL CONDITION | 0.0325 | −0.765 | 0.805 |

A specific construction of each lens group will be described by reverting to FIG. 1. The first lens group I includes, from the enlargement side opposed to the screen, a positive lens element and at least one negative lens element. The second lens group II is composed of the first positive lens unit $II_A$ including a positive lens element and a negative meniscus lens element, and the second positive lens unit $II_B$ including at least two positive lens elements and at least two negative lens elements. The third lens group III includes at least one positive lens element and at least one negative lens element.

The first lens group I is a lens system comprising a positive-negative combination, and contributes to compensation for spherical aberration.

The second lens group II is a variation of the Ernoster type which includes a plurality of lens elements having positive powers at the enlargement side for shifting the principal point toward the enlargement side to facilitate reduction in the calculated distance $e_I$ between the first and second lens groups I and II in the longest focal length condition and increase in the magnifying region, that is to reduce the total distance of movement of the second lens group II.

Further, the first and second positive lens units of the second lens group II move toward the reduction side during a zooming operation from the longest focal length condition to the shortest focal length condition. These units move independently of each other for compensating for astigmatism and off-axial coma occurring during the zooming operation.

The third lens group III is a lens group disposed located farthest from the aperture stop S, and facilitates compensation for astigmatism and distortion.

Further, it is desirable for this zoom lens system to satisfy the following conditional expressions:

$$0.35 < f_{IIL}/f_L < 0.45 \qquad [1]$$

$$-0.25 < e_I/f_L < 0.15 \qquad [2]$$

where $f_{IIL}$ represents the focal length of the second lens group II in the longest focal length condition, $f_L$ represents the focal length of the entire system in the longest focal length condition, and $e_I$ represents the calculated distance between the first and second lens groups I and II (i.e. the distance between the principal planes) in the longest focal length condition.

The conditional expression [1] is for maintaining an appropriate distance of movement of the second lens group II and yet for minimizing the number of components of the second lens group II.

In the event of deviation from its lower limit, the number of components of the second lens group II will be increased although the distance of movement is reduced. Above its upper limit, the distance of movement will be increased which makes it impossible to maintain a clearance between the second and third lens groups II and III.

The conditional expression [2] shows a condition for making the amount of movement of the second lens group II proper.

As is evident from the foregoing equation [b], the magnification $\beta_{III}$ of the second lens group II describes a hyperbola, and its asymptote is expressed by the following equation:

$$\chi_0 = \frac{1}{\psi_{II}} - e_I + \frac{S_1}{\psi_I S_1 + 1} \qquad [3]$$

It is necessary for $\chi_0$ to be less than 0 in order to realize a monotonic increase with the condition $\chi > 0$.

That is, the following condition must be satisfied:

$$e_I > \frac{1}{\psi_{II}} + \frac{S_1}{\psi_I S_1 + 1}$$

If this expression is substituted with $\psi_I = -0.03047$, $\psi_{II} = 0.06410$ and $S_1 - 957.1$ in Example 1, $e_I/f_L > -0.39$.

The lower limit of the foregoing conditional expression [2] is for satisfying this condition and maintaining the rate of change of magnification $\beta_{II}$ not too high. In the event of deviation from this lower limit, the rate of change of magnification $\beta_{II}$ will be increased relative to the movement $\chi$ of the second lens group II, thereby increasing manufacturing error sensitivity. Above the upper limit, the second lens group II will become movable by an increased amount.

The third lens group III is provided as a positive lens group for realizing a telephoto type with a relatively long distance from the end face of the first lens group I at the enlargement side to the film plane. Further, by providing the third lens group III as a positive lens group, the pupil position at the reduction side is located remote from the film plane compared with the focal length in the longest focal length condition. This allows the lens system to be similar to a different lens system having a short focal length and Köhler's illumination system.

Figure 5A:
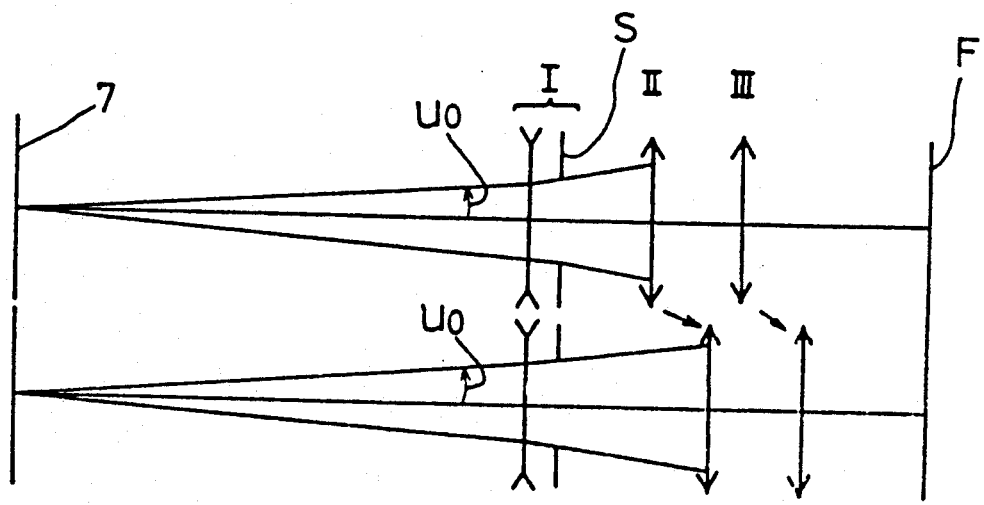
FIG. 5A is a schematic view illustrating a span angle of an axial beam in the zoom lens system of the present invention.

Since, in this zoom lens system, the first lens group I is fixed and includes the aperture stop S disposed at the reduction side, the axial beam has a constant span angle $u_0$ and a constant F-number at the enlargement side during a zooming operation from the longest focal length condition to the shortest focal length condition as shown in FIG. 5A.

Figure 5B:
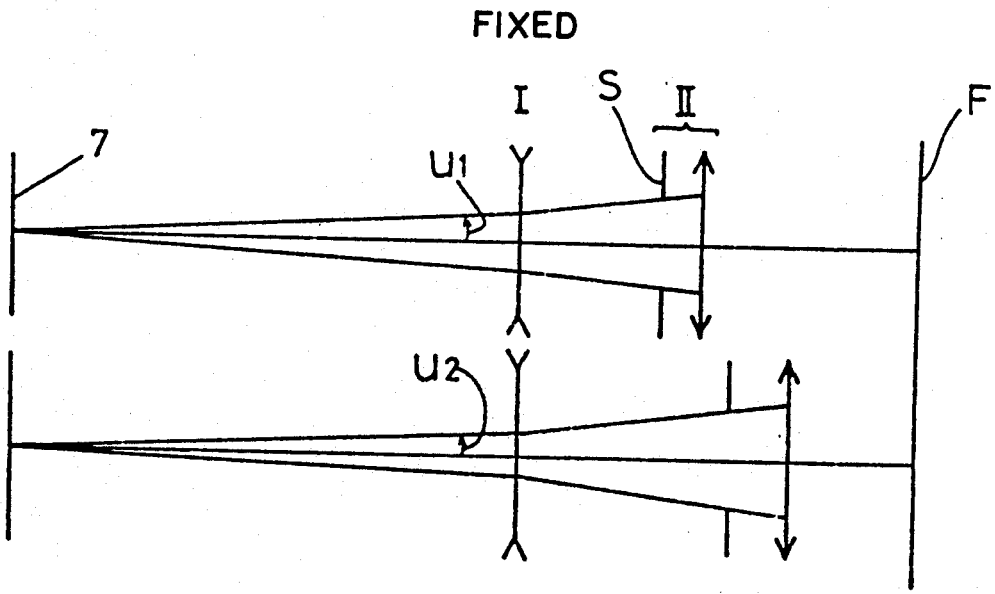
FIG. 5B is a schematic view illustrating a span angle of an axial beam in a conventional two group zoom lens system.

By contrast, in the zoom lens system shown in FIG. 5B in which the aperture stop S and the lens group disposed at the enlargement side of the aperture stop S are movable, the axial beam has a span angle $u_1$ variable with a zooming operation from the longest focal length condition to the shortest focal length condition, which entails variations in brightness.

Further, since the first lens group I has a relatively high negative refracting power compared with the refracting power of the entire system, the combination of a positive lens element and a negative lens element effectively compensates for various aberrations occurring adjacent the optical axis. By providing the positive lens element as a compound lens, the first lens group I is capable of compensating for chromatic aberration with ease.

The second positive lens unit $II_B$ is itself basically a positive lens of the Ernoster type. The lens unit $II_B$ has a front principal point disposed forwardly for reducing the calculated distance $e_I$ between the first lens group I and second lens group II in the longest focal length condition to assure an increased range of magnification. The three, negative, positive and negative lens elements of the second positive lens unit $II_B$ adjacent the reduction side effectively compensate for coma.

Figure 6:
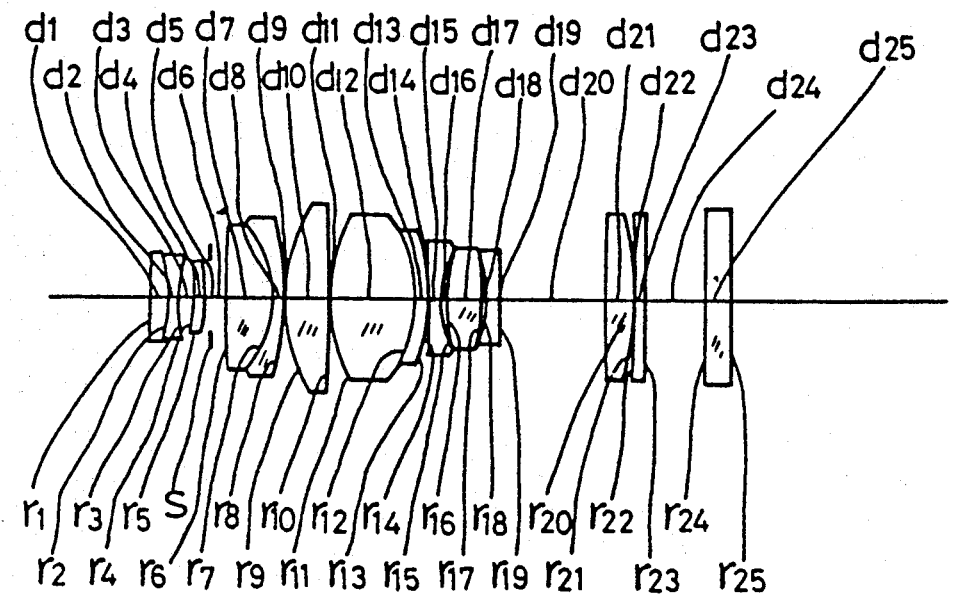
FIGS. 6 through 8 are sectional views of lens constructions in Examples 1 through 3 of the present invention, respectively.
Figure 7:
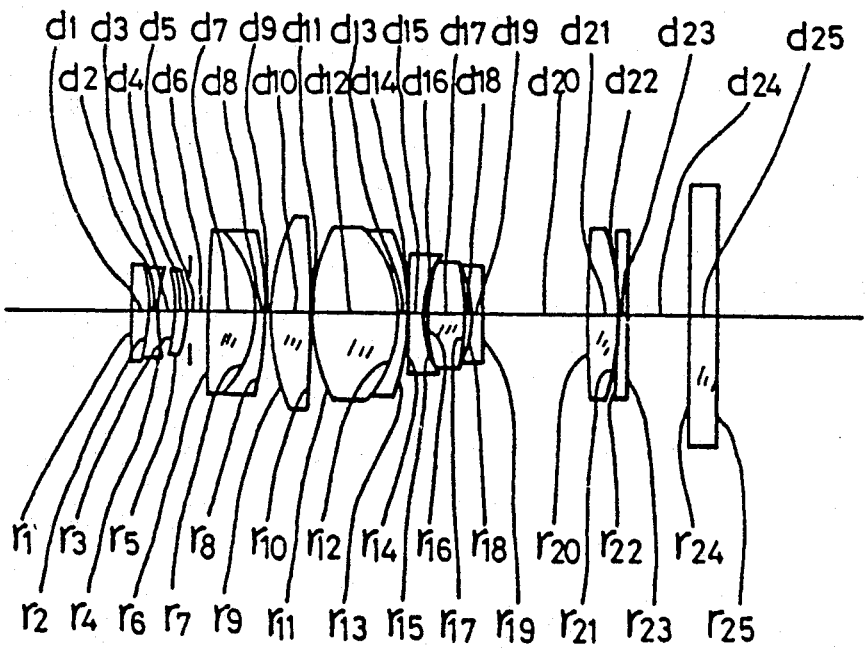
Figure 8:
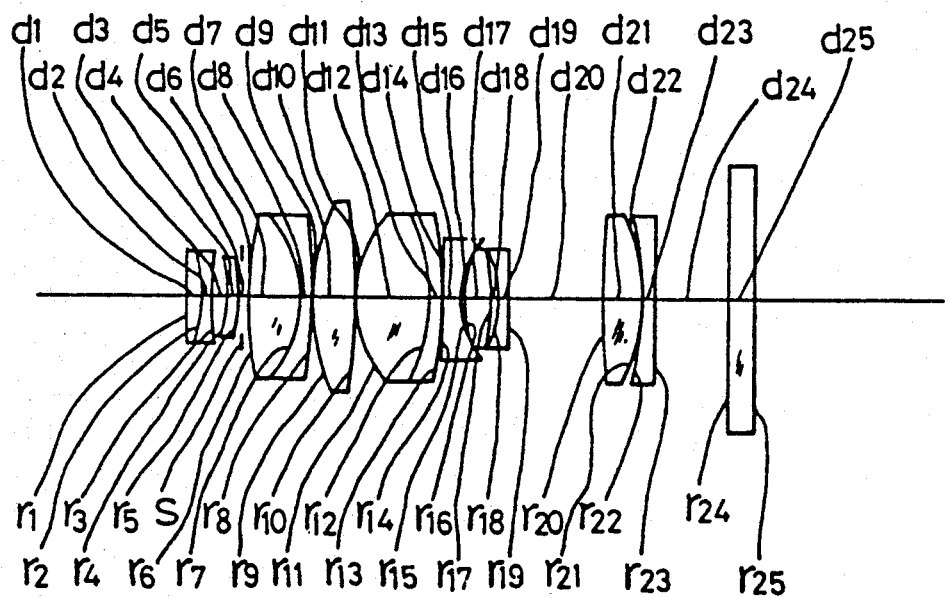
Figure 10A:
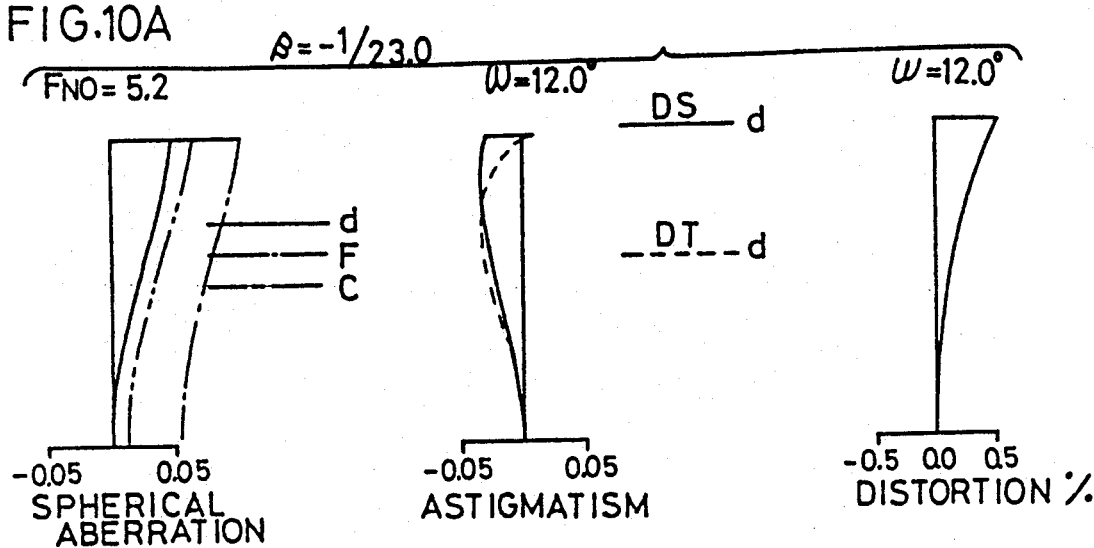
Figure 10B:
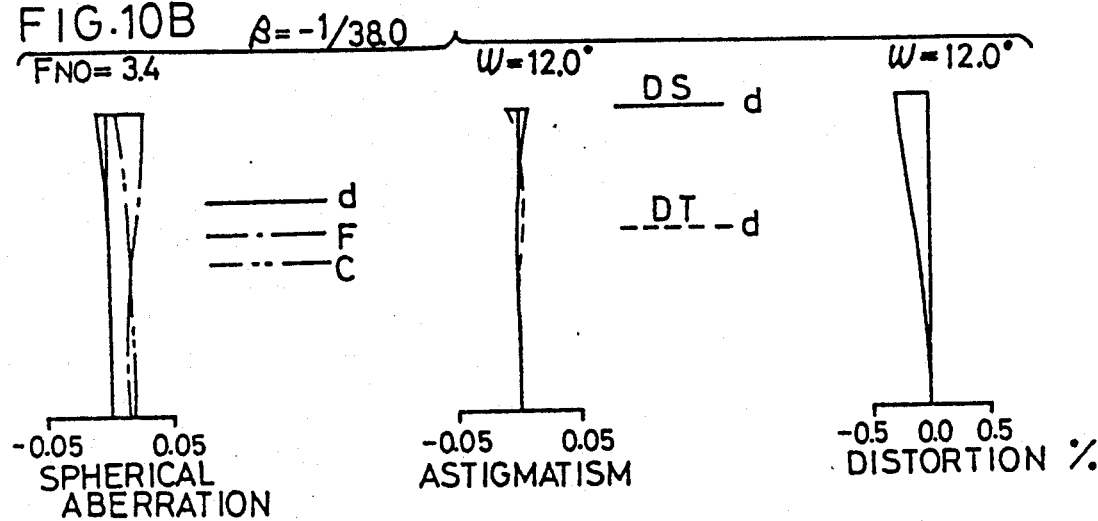
Figure 10C:
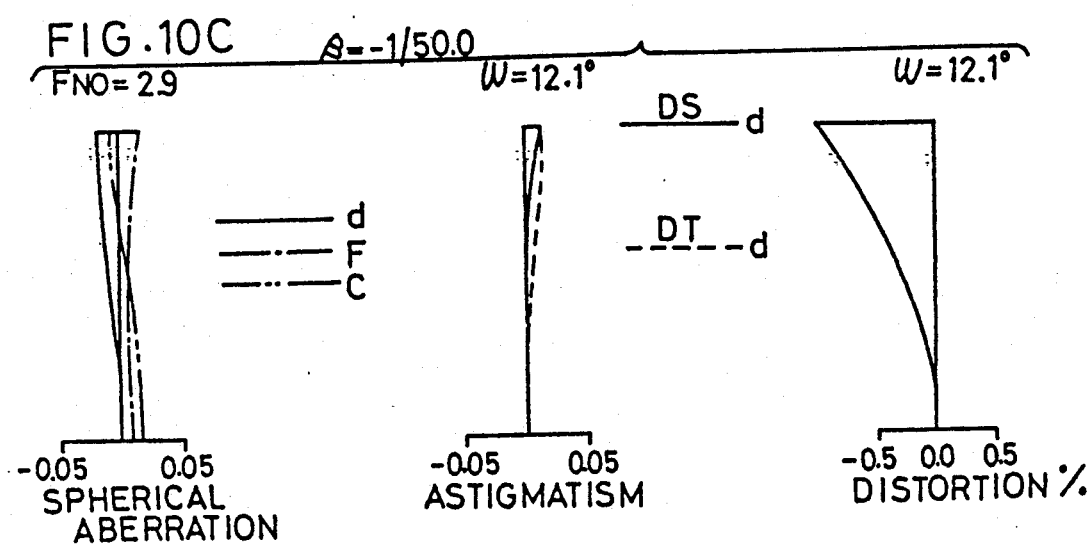

FIG. 6 through 8 show specific constructions of Examples 1 through 3 in this embodiment, and Tables 2 through 4 show numeric data thereof. These tables of data show, in the order from the enlargement side opposed to the screen, numeric values for radii of curvature $r_1, r_2, \ldots r_n$, axial distances $d_1, d_2, \ldots d_n$, refractive indexes $N_1, N_2, \ldots N_n$ at lines d of the lens elements, and Abbe numbers of the lens elements $\nu_1, \nu_2, \ldots \nu_n$. The plain parallel plate at the reduction side is a film holder.

FIGS. 9A, 9B and 9C through 11A, 11B and 11C show aberration curves in Examples 1 through 3. FIGS. 9A, 10A and 11A show the spherical aberration, astigmatism and distortion of the respective examples in the longest focal length condition. FIGS. 9B, 10B and 11B show the spherical aberration, astigmatism and distortion of the respective examples in the intermediate focal length condition. FIGS. 9C, 10C and 11C show the spherical aberration, astigmatism and distortion of the respective examples in the shortest focal length condition.

TABLE 2

| | | f = 41.6 ~ 25.5 ~ 19.5 | FNo. = 5.2 | | |
|---|---|---|---|---|---|
| RADIUS OF CURV. | | AXIAL DISTANCE | REFRACT. IND. (Nd) | | ABBE No. (νd) |
| $r_1$ | ∞ | | | | |
| | | $d_1$ 2.24 | $N_1$ 1.8074 | $\nu_1$ | 31.6 |
| $r_2$ | −13.55 | | | | |
| | | $d_2$ 0.98 | $N_2$ 1.4875 | $\nu_2$ | 70.4 |
| $r_3$ | 24.12 | | | | |
| | | $d_3$ 2.18 | | | |

TABLE 2-continued

| | | f = 41.6 ~ 25.5 ~ 19.5 | | FNo. = 5.2 | | | |
|---|---|---|---|---|---|---|---|
| RADIUS OF CURV. | | AXIAL DISTANCE | | REFRACT. IND. (Nd) | | ABBE No. (νd) | |
| $r_4$ | −11.88 | | | | | | |
| | | $d_4$ | 0.98 | $N_3$ | 1.7545 | $\nu_3$ | 40.0 |
| $r_5$ | 24.07 | | | | | | |
| | | $d_5$ | 0.49 | | | | |
| S(STOP) | — | | | | | | |
| | | $d_6$ | 1.97 ~ 8.57 ~ 13.16 | | | | |
| $r_6$ | 95.13 | | | | | | |
| | | $d_7$ | 5.74 | $N_4$ | 1.6180 | $\nu_4$ | 63.4 |
| $r_7$ | −11.95 | | | | | | |
| | | $d_8$ | 1.18 | $N_5$ | 1.8467 | $\nu_5$ | 23.8 |
| $r_8$ | −31.26 | | | | | | |
| | | $d_9$ | 0.41 ~ 4.33 ~ 3.67 | | | | |
| $r_9$ | 22.50 | | | | | | |
| | | $d_{10}$ | 4.89 | $N_6$ | 1.7569 | $\nu_6$ | 29.7 |
| $r_{10}$ | −126.06 | | | | | | |
| | | $d_{11}$ | 0.15 | | | | |
| $r_{11}$ | 20.00 | | | | | | |
| | | $d_{12}$ | 10.06 | $N_7$ | 1.4875 | $\nu_7$ | 70.4 |
| $r_{12}$ | −14.82 | | | | | | |
| | | $d_{13}$ | 1.28 | $N_8$ | 1.8467 | $\nu_8$ | 23.8 |
| $r_{13}$ | −23.48 | | | | | | |
| | | $d_{14}$ | 0.15 | | | | |
| $r_{14}$ | −59.87 | | | | | | |
| | | $d_{15}$ | 1.31 | $N_9$ | 1.8467 | $\nu_9$ | 23.8 |
| $r_{15}$ | 10.83 | | | | | | |
| | | $d_{16}$ | 0.93 | | | | |
| $r_{16}$ | 18.43 | | | | | | |
| | | $d_{17}$ | 4.01 | $N_{10}$ | 1.8467 | $\nu_{10}$ | 23.8 |
| $r_{17}$ | −25.07 | | | | | | |
| | | $d_{18}$ | 1.02 | | | | |
| $r_{18}$ | −11.50 | | | | | | |
| | | $d_{19}$ | 0.98 | $N_{11}$ | 1.8500 | $\nu_{11}$ | 40.0 |
| $r_{19}$ | 158.91 | | | | | | |
| | | $d_{20}$ | 12.58 ~ 5.63 ~ 0.56 | | | | |
| $r_{20}$ | 193.32 | | | | | | |
| | | $d_{21}$ | 3.49 | $N_{12}$ | 1.8467 | $\nu_{12}$ | 23.8 |
| $r_{21}$ | −26.70 | | | | | | |
| | | $d_{22}$ | 0.15 | | | | |
| $r_{22}$ | −84.20 | | | | | | |
| | | $d_{23}$ | 0.98 | $N_{13}$ | 1.8500 | $\nu_{13}$ | 40.0 |
| $r_{23}$ | ∞ | | | | | | |
| | | $d_{24}$ | 6.94 ~ 3.37 ~ 4.51 | | | | |
| $r_{24}$ | ∞ | | | | | | |
| | | $d_{25}$ | 3.00 | $N_{14}$ | 1.5168 | $\nu_{14}$ | 64.2 |
| $r_{25}$ | ∞ | | | | | | |
| | | (FILM HOLDER) | | | | | |
| | | Σd = 68.0870 | | | | | |

TABLE 3

| | | f = 42.3 ~ 26.0 ~ 19.8 | | FNo. = 5.2 | | | |
|---|---|---|---|---|---|---|---|
| RADIUS OF CURV. | | AXIAL DISTANCE | | REFRACT. IND. (Nd) | | ABBE No. (νd) | |
| $r_1$ | ∞ | | | | | | |
| | | $d_1$ | 1.86 | $N_1$ | 1.8074 | $\nu_1$ | 31.6 |
| $r_2$ | −13.77 | | | | | | |
| | | $d_2$ | 1.00 | $N_2$ | 1.4875 | $\nu_2$ | 70.4 |
| $r_3$ | 24.55 | | | | | | |
| | | $d_3$ | 2.24 | | | | |
| $r_4$ | −12.06 | | | | | | |
| | | $d_4$ | 1.00 | $N_3$ | 1.8500 | $\nu_3$ | 40.0 |
| $r_5$ | −24.49 | | | | | | |
| | | $d_5$ | 0.50 | | | | |
| S(STOP) | — | | | | | | |
| | | $d_6$ | 2.00 ~ 8.74 ~ 13.38 | | | | |
| $r_6$ | 95.45 | | | | | | |
| | | $d_7$ | 5.83 | $N_4$ | 1.6180 | $\nu_4$ | 63.4 |
| $r_7$ | −12.17 | | | | | | |
| | | $d_8$ | 1.20 | $N_5$ | 1.8467 | $\nu_5$ | 23.8 |
| $r_8$ | −31.85 | | | | | | |
| | | $d_9$ | 0.40 ~ 4.47 ~ 3.82 | | | | |
| $r_9$ | 22.79 | | | | | | |
| | | $d_{10}$ | 5.07 | $N_6$ | 1.7569 | $\nu_6$ | 29.7 |
| $r_{10}$ | −128.25 | | | | | | |
| | | $d_{11}$ | 0.15 | | | | |
| $r_{11}$ | 20.34 | | | | | | |
| | | $d_{12}$ | 10.15 | $N_7$ | 1.4875 | $\nu_7$ | 70.4 |
| $r_{12}$ | −15.04 | | | | | | |
| | | $d_{13}$ | 1.30 | $N_8$ | 1.8467 | $\nu_8$ | 23.8 |

TABLE 3-continued f = 42.3 ~ 26.0 ~ 19.8    FNo. = 5.2

| RADIUS OF CURV. | | AXIAL DISTANCE | REFRACT. IND. (Nd) | | ABBE No. (νd) | |
|---|---|---|---|---|---|---|
| $r_{13}$ | −23.90 | | | | | |
| | | $d_{14}$ 0.15 | | | | |
| $r_{14}$ | −60.81 | | | | | |
| | | $d_{15}$ 1.20 | $N_9$ | 1.8467 | $\nu_9$ | 23.8 |
| $r_{15}$ | 11.00 | | | | | |
| | | $d_{16}$ 0.81 | | | | |
| $r_{16}$ | 18.72 | | | | | |
| | | $d_{17}$ 4.41 | $N_{10}$ | 1.8467 | $\nu_{10}$ | 23.8 |
| $r_{17}$ | −25.50 | | | | | |
| | | $d_{18}$ 1.03 | | | | |
| $r_{18}$ | −11.69 | | | | | |
| | | $d_{19}$ 1.00 | $N_{11}$ | 1.8500 | $\nu_{11}$ | 40.0 |
| $r_{19}$ | 154.75 | | | | | |
| | | $d_{20}$ 12.56 ~ 5.69 ~ 0.57 | | | | |
| $r_{20}$ | 192.47 | | | | | |
| | | $d_{21}$ 3.56 | $N_{12}$ | 1.8467 | $\nu_{12}$ | 23.8 |
| $r_{21}$ | −27.00 | | | | | |
| | | $d_{22}$ 0.15 | | | | |
| $r_{22}$ | −85.07 | | | | | |
| | | $d_{23}$ 1.00 | $N_{13}$ | 1.8500 | $\nu_{13}$ | 40.0 |
| $r_{23}$ | ∞ | | | | | |
| | | $d_{24}$ 7.40 ~ 3.51 ~ 4.63 | | | | |
| $r_{24}$ | ∞ | | | | | |
| | | $d_{25}$ 3.00 | $N_{14}$ | 1.5168 | $\nu_{14}$ | 64.2 |
| $r_{25}$ | ∞ | | | | | |

(FILM HOLDER)
Σd = 68.965

TABLE 4 f = 42.2 ~ 26.0 ~ 20.7    FNo. = 5.2

| RADIUS OF CURV. | | AXIAL DISTANCE | REFRACT. IND. (Nd) | | ABBE No. (νd) | |
|---|---|---|---|---|---|---|
| $r_1$ | ∞ | | | | | |
| | | $d_1$ 1.86 | $N_1$ | 1.8467 | $\nu_1$ | 23.8 |
| $r_2$ | −14.8 | | | | | |
| | | $d_2$ 1.00 | $N_2$ | 1.6057 | $\nu_2$ | 37.8 |
| $r_3$ | 32.60 | | | | | |
| | | $d_3$ 2.17 | | | | |
| $r_4$ | −13.92 | | | | | |
| | | $d_4$ 1.00 | $N_3$ | 1.8500 | $\nu_3$ | 40.0 |
| $r_5$ | −24.92 | | | | | |
| | | $d_5$ 0.50 | | | | |
| S(STOP) | — | | | | | |
| | | $d_6$ 1.00 ~ 8.80 ~ 12.77 | | | | |
| $r_6$ | 63.53 | | | | | |
| | | $d_7$ 5.96 | $N_4$ | 1.6180 | $\nu_4$ | 63.4 |
| $r_7$ | −11.84 | | | | | |
| | | $d_8$ 1.20 | $N_5$ | 1.8467 | $\nu_5$ | 23.8 |
| $r_8$ | −52.48 | | | | | |
| | | $d_9$ 0.40 ~ 3.25 ~ 2.92 | | | | |
| $r_9$ | 26.74 | | | | | |
| | | $d_{10}$ 4.67 | $N_6$ | 1.8074 | $\nu_6$ | 31.6 |
| $r_{10}$ | −51.73 | | | | | |
| | | $d_{11}$ 0.15 | | | | |
| $r_{11}$ | 14.52 | | | | | |
| | | $d_{12}$ 8.65 | $N_7$ | 1.4875 | $\nu_7$ | 70.4 |
| $r_{12}$ | −17.49 | | | | | |
| | | $d_{13}$ 1.30 | $N_8$ | 1.8467 | $\nu_8$ | 23.8 |
| $r_{13}$ | −32.47 | | | | | |
| | | $d_{14}$ 0.15 | | | | |
| $r_{14}$ | −94.29 | | | | | |
| | | $d_{15}$ 1.50 | $N_9$ | 1.8500 | $\nu_9$ | 40.0 |
| $r_{15}$ | 8.80 | | | | | |
| | | $d_{16}$ 1.05 | | | | |
| $r_{16}$ | 18.03 | | | | | |
| | | $d_{17}$ 2.88 | $N_{10}$ | 1.8467 | $\nu_{10}$ | 23.8 |
| $r_{17}$ | −26.14 | | | | | |
| | | $d_{18}$ 0.79 | | | | |
| $r_{18}$ | −12.80 | | | | | |
| | | $d_{19}$ 1.00 | $N_{11}$ | 1.8074 | $\nu_{11}$ | 31.6 |
| $r_{19}$ | 65.05 | | | | | |
| | | $d_{20}$ 11.36 ~ 5.94 ~ 0.59 | | | | |
| $r_{20}$ | 79.72 | | | | | |
| | | $d_{21}$ 4.42 | $N_{12}$ | 1.7440 | $\nu_{12}$ | 44.9 |
| $r_{21}$ | −19.80 | | | | | |
| | | $d_{22}$ 0.15 | | | | |
| $r_{22}$ | −39.50 | | | | | |
| | | $d_{23}$ 1.50 | $N_{13}$ | 1.8500 | $\nu_{13}$ | 40.0 |

TABLE 4-continued f = 42.2 ~ 26.0 ~ 20.7    FNo. = 5.2

| RADIUS OF CURV. | AXIAL DISTANCE | REFRACT. IND. (Nd) | ABBE No. (νd) |
|---|---|---|---|
| $r_{23}$  ∞ | | | |
| | $d_{24}$  8.71 ~ 3.51 ~ 5.22 | | |
| $r_{24}$  ∞ | | | |
| | $d_{25}$  3.00 | $N_{14}$  1.5168 | $\nu_{14}$  64.2 |
| $r_{25}$  ∞ | | | |
| | (FILM HOLDER) | | |
| | Σd = 66.374 | | |

TABLE 5

| | EXAMPLE 1 | EXAMPLE 2 | EXAMPLE 3 |
|---|---|---|---|
| MAG.RANGE | −1/23 x ~ −1/50 x | −1/23 x ~ −1/50 x | −1/23 x ~ −1/48 x |
| f | 41.6 ~ 25.5 ~ 19.5 | 42.3 ~ 26.0 ~ 19.8 | 42.2 ~ 26.0 ~ 20.7 |
| F No. | 5.2 ~ 3.4 ~ 2.9 | 5.2 ~ 3.4 ~ 2.9 | 5.2 ~ 3.4 ~ 2.9 |
| ω | 12.24 ~ 12.24 ~ 12.26 | 12.0 ~ 120 ~ 12.1 | 12.0 ~ 12.0 ~ 12.1 |
| $f_{II}/f_L$ | 0.375 | 0.374 | 0.408 |
| $e_I/f_L$ | −1.80 | −0.184 | −0.213 |

Table 5 shows a table of numeric values for the foregoing conditional expressions in Examples 1 through 3.

As described above, this zoom lens system allows the image rotating prism to be constructed small with the value of (prism length)/(focal length of the entire system at a time of $\beta = -1/23$) at 1.42.

Further, this zoom lens system effectively compensates for various aberrations with the magnification $\beta$ ranging from about $-1/23$ to about $-1/50$.

It is possible to substantially fix the pupil position at the reduction side during a zooming operation, thereby making the movement of a condenser lens unnecessary for Köhler's illumination. Further, F-numbers at the enlargement side are made constant, thereby maintaining constant illumination on the screen.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising, in order from an enlargement side,
   a first lens group of a negative power which is fixed during a zooming operation and includes, in order from the enlargement side, a positive lens element and a negative lens element,
   a second lens group of a positive power which is movable during a zooming operation and includes, in order from the enlargement side, a first positive lens unit and a second positive lens unit, said first positive lens unit having a positive lens element and a negative meniscus lens element, said second positive lens unit having two positive lens elements and two negative lens elements, said first and second positive lens units being independently movable toward a reduction side during a zooming operation from a longest focal length condition to a shortest focal length condition, and
   a third lens group of a positive power which is movable during a zooming operation and includes, in order from the enlargement side, a positive lens element and a negative lens element.

2. A zoom lens system as claimed in claim 1, wherein said first lens group further includes an aperture stop.

3. A zoom lens system as claimed in claim 1, wherein the positive lens element and the negative lens element of said first lens group are cemented together so as to form a compound lens unit.

4. A zoom lens system as claimed in claim 1, wherein said second positive lens unit includes, in order from the enlargement side, a positive lens element, a biconvex lens element, a negative lens element, a biconvex lens element and a negative lens element.

5. A zoom lens system as claimed in claim 1, wherein said positive lens element of the third lens group has a convex surface directed to the reduction side.

6. A zoom lens system as claimed in claim 1, satisfying the following condition (a) and (b):

$$0.35 < f2L/f1 < 0.45 \quad \text{(a)}$$

$$-0.25 < e1/f1 < 0 \quad \text{(b)}$$

where f2L represents the focal length of said second lens group in the longest focal length condition, f1 represents the focal length of the system in the longest focal length condition, and e1 represents a calculated distance between a principal plane of the first lens group and a principal plane of the second lens group in the longest focal length condition.

* * * * *